United States Patent [19]

Ewen et al.

[11] 3,975,736

[45] Aug. 17, 1976

[54] RADIO THEODOLITE ANGLE MEASURING APPARATUS

[75] Inventors: Harold I. Ewen, Weston; George G. Haroules, Lexington, both of Mass.

[73] Assignee: The United States of America as represented by the Secretary of the Department of Transportation, Washington, D.C.

[22] Filed: Feb. 11, 1975

[21] Appl. No.: 549,081

[52] U.S. Cl. ............................................ 343/113 R
[51] Int. Cl.² ........................................... G01S 5/02
[58] Field of Search ....................... 343/113 R, 105; 325/329

[56] References Cited
UNITED STATES PATENTS

| | | | |
|---|---|---|---|
| 3,080,559 | 3/1963 | Thor et al. | 343/113 R |
| 3,213,453 | 10/1965 | Morrison, Jr. et al. | 343/100 R |
| 3,346,860 | 10/1967 | Earp | 343/105 R |
| 3,729,679 | 4/1973 | Day, Jr. | 325/329 |
| 3,766,556 | 10/1973 | Amoroso, Jr. | 343/113 R |
| 3,900,879 | 8/1975 | Lewinter | 343/113 R |
| 3,928,852 | 12/1975 | Barker | 343/105 R |

*Primary Examiner*—Maynard R. Wilbur
*Assistant Examiner*—T. M. Blum
*Attorney, Agent, or Firm*—Herbert E. Farmer; Harold P. Deeley, Jr.

[57] ABSTRACT

An intermediate frequency interferometric technique and apparatus for the measurement of angles, for example the measurement of the elevation and azimuth bearing angles between an aircraft installed transmitter and a ground based receiver, are disclosed. Carrier and sideband signals emitted by a mobile transmitter are received by at least a pair of fixed position antennas, spaced at a nominal distance equivalent to the wavelength of the frequency separation between the transmitted carrier and its associated sideband, and the angle related path length difference between the transmitter and the spaced receiving antennas is measured in wavelengths at the carrier modulation frequency.

12 Claims, 4 Drawing Figures

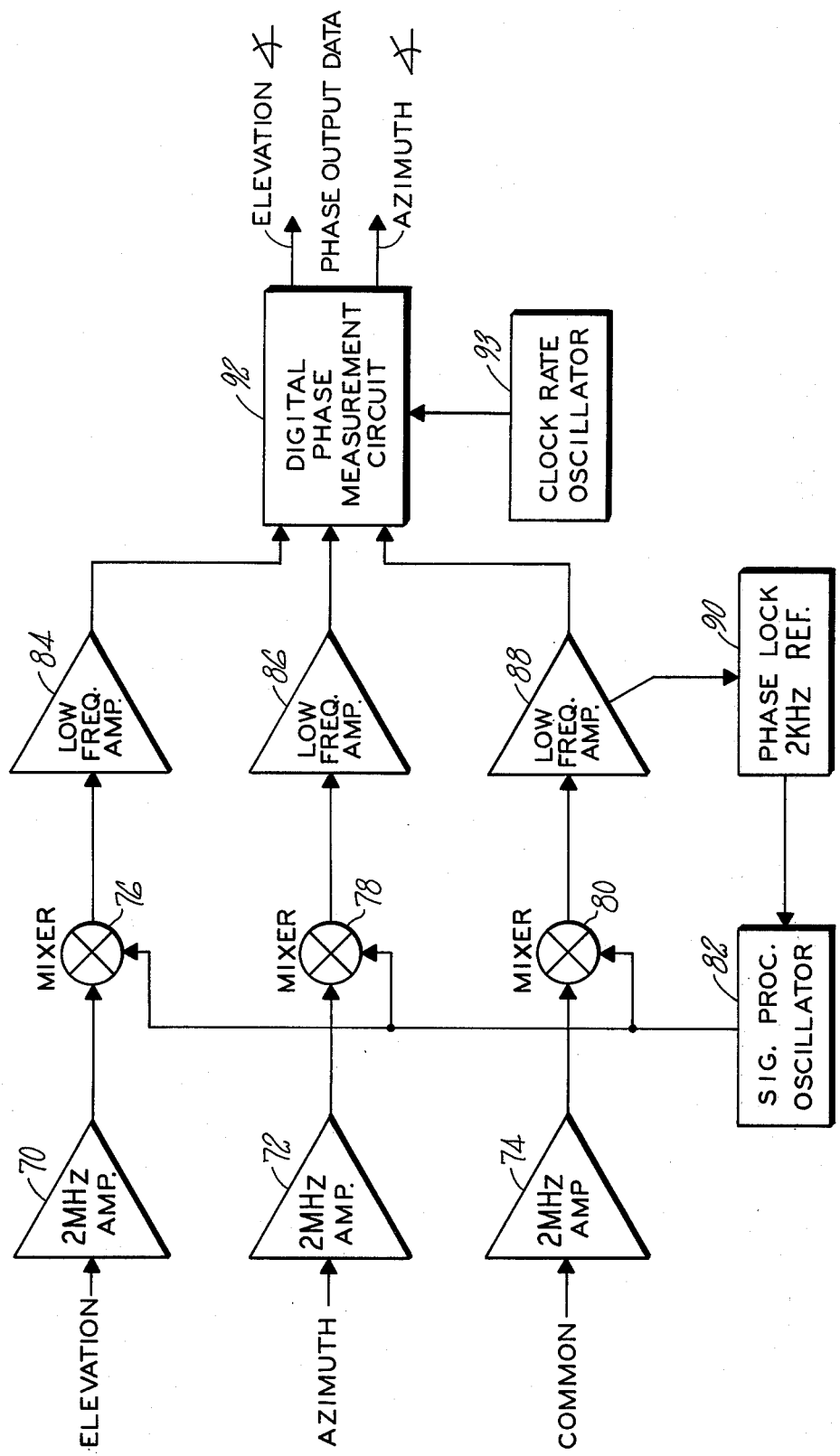

RADIO THEODOLITE ANGLE MEASURING APPARATUS

ORIGIN OF THE INVENTION

The invention described herein was made in the course of, or under, a contract with the United States Department of Transportation and may be manufactured and used by or for the Government of the United States of America for governmental purposes without the payment of any royalties thereon or therefor.

BACKGROUND OF THE INVENTION

1. Field of the Invention

The present invention relates to direction finding systems, and particularly to aircraft surveillance systems of the type which determine the bearing angles (elevation and azimuth) in the local coordinate system of a fixed ground based receiving site by processing a signal radiated by an airborne transmitter to the ground based receiver. More specifically, this invention is directed to a technique for the measurement of the bearing angle or angles between a mobile transmitter and fixed receiver station. Accordingly, the general objects of the present invention are to provide novel and improved apparatus and methods of such character.

2. Description of the Prior Art

While not limited thereto in its utility, the present invention will be discussed in the environment of a landing system for aircraft. Known apparatus for determining the elevation and azimuth bearing angles of an aircraft which use a signal radiated from the aircraft include angle tracking radar beacon systems and conventional interferometric receiving systems. The angle measurement accuracy of radar beacon systems is determined by the size of the receiving antenna aperture measured in wavelengths; i.e., the larger the aperture the more precise the angular measurement capability. However, the minimum distance from the receiving antenna at which the angle measurement capability can be realized increases as the square of the antenna aperture diameter. Radar beacon systems consequently provide a precision angle measurement capability at distances which exceed the surveillance distance requirements for monitoring a precision navigation guidance aid such as the microwave landing system. Prior art interferometric techniques overcome the disadvantages of large aperture far field restraints associated with radar beacon systems; however, the magnitude of angle sector coverage requirements for monitoring of landing guidance systems exceed the angle ambiguity limits of simple prior art interferometric techniques. Prior art interferometric methods for overcoming angle ambiguity restraints, in order to provide improved angle sector coverage, have the disadvantage that the antenna systems employed are complex and generally require that critical proportioning of circuit constants be established and maintained between the elements of the receiving apparatus if satisfactory operation of the direction finding system is to be realized.

SUMMARY OF THE INVENTION

The present invention overcomes the above briefly discussed and other deficiencies and disadvantages of the prior art by providing a novel and improved radio theodolite measurement system based on the principles of intermediate frequency interferometry. The present invention differs from prior art interferometric techniques for near field bearing angle measurements in the method of transmission and reception of a common modulation frequency component. This characteristic of the invention may be contrasted with transmission and reception of a single carrier component in prior art interferometric methods.

According to the present invention, bearing angle information is transmitted from an aircraft to a pair of ground based receiving antennas located at either end of a baseline. The airborne transmitter simultaneously radiates a carrier and a sideband signal. At each receiving antenna the carrier and sideband signals received from the aircraft installed transmitter are heterodyned to derive their difference or modulation frequency. By this process the receiver derives the modulation frequency associated with the heterodyning of signals received by each of the receiving antennas individually. Though the modulation frequencies are at the same frequency, they each bear a phase relationship determined by the length of the path travelled by their associated carrier and sideband signal components between the transmitting antenna and the particular receiving antenna. The receiver includes means for determining the phase difference between these modulation frequencies. This phase difference is commensurate with the bearing angle between the receiver and airborne transmitter; the bearing angle being referenced to a bisecting plane normal to the baseline.

Thus, to summarize, in accordance with the present invention the simultaneous transmission of a sideband signal with the carrier signal from a mobile transmitter provides means for the stationary receiver to determine the position angle to the mobile transmitter relative to a baseline direction in a manner which is independent of the carrier frequency. The invention thereby allows a wide and unambiguous angle measurement capability essentially independent of the carrier frequency.

It is, accordingly, an object of the present invention to provide a new and improved surveillance system for the monitoring of aircraft landing guidance system performance which avoids one or more of the disadvantages and limitations of prior art radar beacon systems and interferometric systems.

It is a further object of the invention to provide a radio theodolite angle measurement system based on intermediate frequency interferometric principles which overcomes the angle ambiguity restraints imposed by conventional prior art application of interferometric principles.

BRIEF DESCRIPTION OF THE DRAWINGS

The present invention may be better understood and its numerous objects and advantages will become apparent to those skilled in the art by reference to the accompanying drawings wherein:

FIG. 4 is a functional block diagram of the signal processing circuitry which may be associated with three of the receivers of FIG. 3.

DESCRIPTION OF THE PREFERRED EMBODIMENT

Figure 1:
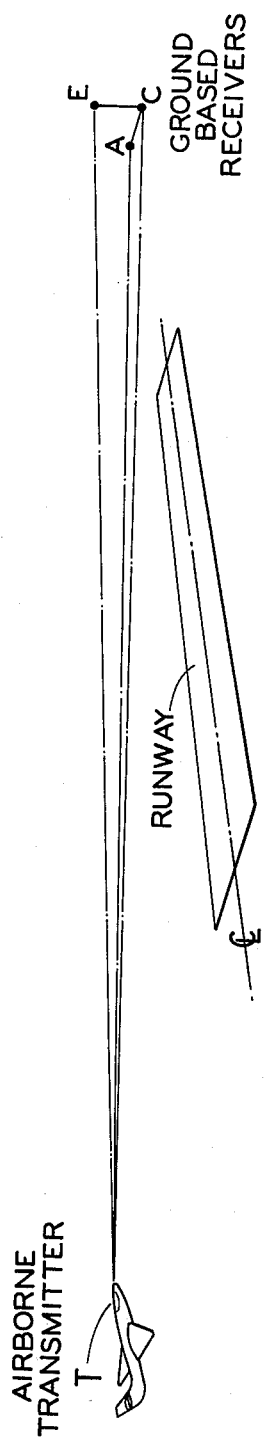
FIG. 1 is a representation of the "problem geometry", in a single coordinate, to which the present invention is directed.

With reference to FIG. 1, a carrier and a sideband signal are simultaneously radiated from a mobile transmitter to a stationary receiver which includes, in the disclosed embodiment, two pair of spaced antennas located at the opposite ends of orthogonal baselines. In FIG. 1 the antennas are indicated at A, C and E; C being a common antenna for each pair.

Figure 2:
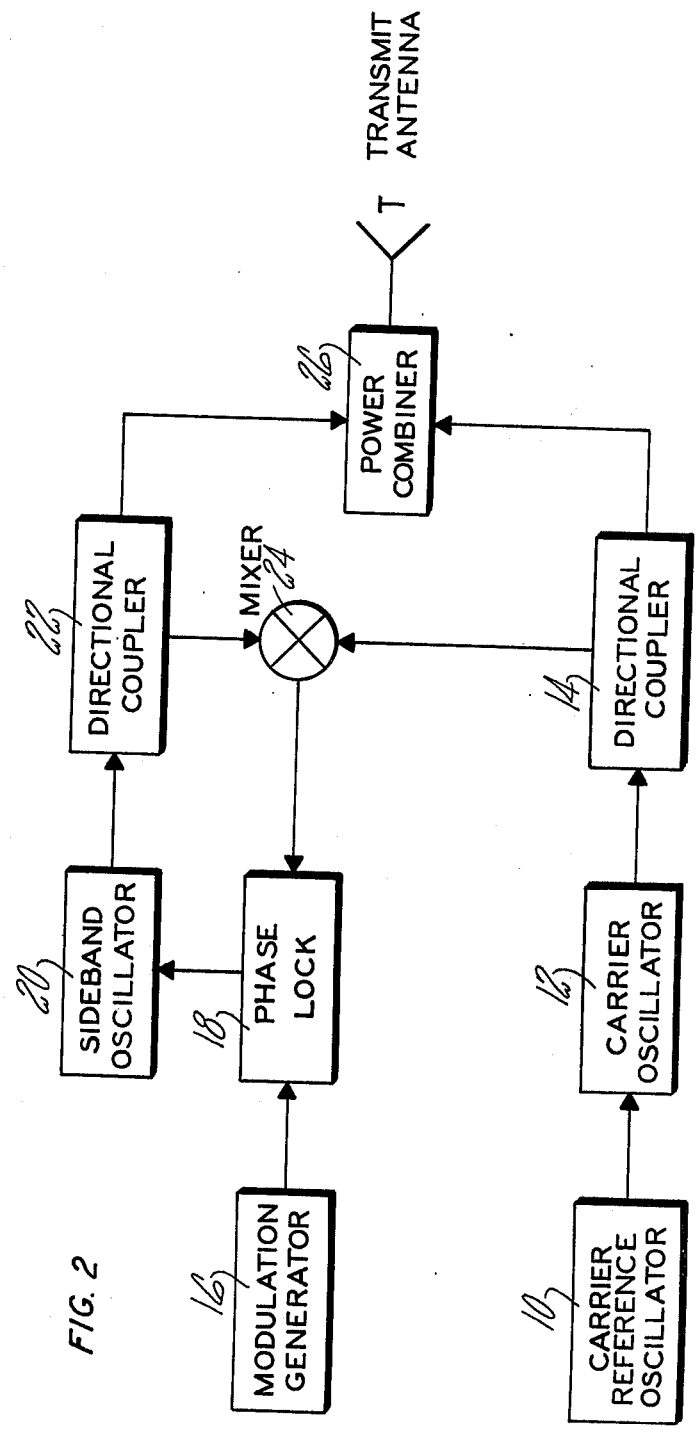
FIG. 2 is a functional block diagram of the airborne transmitter in accordance with the invention.

A mobile or airborne transmitter in accordance with a preferred embodiment of the invention is shown in functional block diagram form in FIG. 2. The receiver includes a pair of oscillators 12 and 20 which respectively generate the carrier and sideband signals. The carrier frequency oscillator 12 is controlled by a carrier reference oscillator 10; oscillator 10 serving as a phase lock reference. The frequency of carrier reference oscillator 10 is selected by a crystal. The crystal frequency will typically be equal to approximately one forty-eighth of the desired output frequency of carrier frequency oscillator 12.

The output frequency of a modulation generator 16 is also selected by a crystal and will typically be in the range of 50 to 125 MHz. Generator 16 includes a frequency doubler which provides modulation generator frequency coverage up to a frequency of 250 MHz in those modes of operation when the carrier frequency is in the C-Band region; i.e., 5.000 to 5.200 GHz.

The frequency of sideband oscillator 20 is controlled by a phase lock loop that maintains the sideband frequency equal to the sum of the carrier frequency generated by oscillator 12 and the modulation frequency provided by generator 16. The frequency control of oscillator 20 is accomplished by heterodyning the carrier oscillator frequency with the sideband oscillator frequency in mixer 24; the two signal inputs to said mixer being derived from directional couplers 14 and 22 respectively. The mixer 24 thus obtains its input carrier oscillator and sideband oscillator signals from the couplers via their sidearms. The main arms of couplers 14 and 22 are respectively interconnected in the signal paths between oscillators 12 and 20 and a power combiner 26. The heterodyning action of mixer 24 provides an output difference frequency to phase lock circuit 18; circuit 18 being located in the feed back loop to the sideband oscillator 20. The output of modulation generator 16 is delivered as a reference input signal to the phase lock circuit 18, thereby establishing the frequency and phase relationship between the carrier oscillator 12 and the sideband oscillator 20. The phase lock circuit 18 thus adjusts the sideband oscillator frequency and phase such that the heterodyned difference frequency signal derived from the mixing action within mixer 24 is identical in frequency and phase to that of the output signal from modulation generator 16.

The carrier sideband oscillator output signals are combined in power combiner 26. At a C-band frequency of operation the combiner 26 would take the form of a "magic tee." The output of the magic-tee power combiner unit 26; i.e., the combined carrier and sideband oscillator signals; is delivered to the transmitting antenna, T.

The radio theodolite ground based receiving system consists, in the disclosed embodiment, of three separate antennas. Each antenna receives the carrier and sideband signal radiated by the airborne transmitter. The elevation and azimuth receiving antennas are arranged on orthogonal baselines with a common antenna element, indicated at C in FIG. 1, located at the intersection of the two baselines. Identical dual channel double conversion superheterodyne receivers are connected to each of the three receiving antennas. The function of these receivers in each case is to heterodyne the received carrier signal with the received sideband signal to extract the difference frequency. The difference frequency is equivalent to the output frequency of the modulation generator 16 at the transmitter. The phase of the modulation frequency in each case, however, is directly related to the path length between the transmitting antenna and each of the three receiving antennas. The three modulation frequencies derived by the three identical dual channel double conversion superheterodyne receivers, connected individually to the three receiving antennas, are fed to a common signal processing circuit. The function of this processing circuit is to extract the phase difference between paired modulation frequency signals corresponding to paired antennas located on the orthogonal baselines of the antenna receiving system; i.e., the phase difference between the modulation frequency obtained from the azimuth antenna A and the common antenna C provides a measure of the azimuth angle bearing of the aircraft, while the phase difference between the modulation frequency obtained from the elevation antenna E and the common antenna C provides a measure of the elevation angle of the aircraft.

Figure 3:
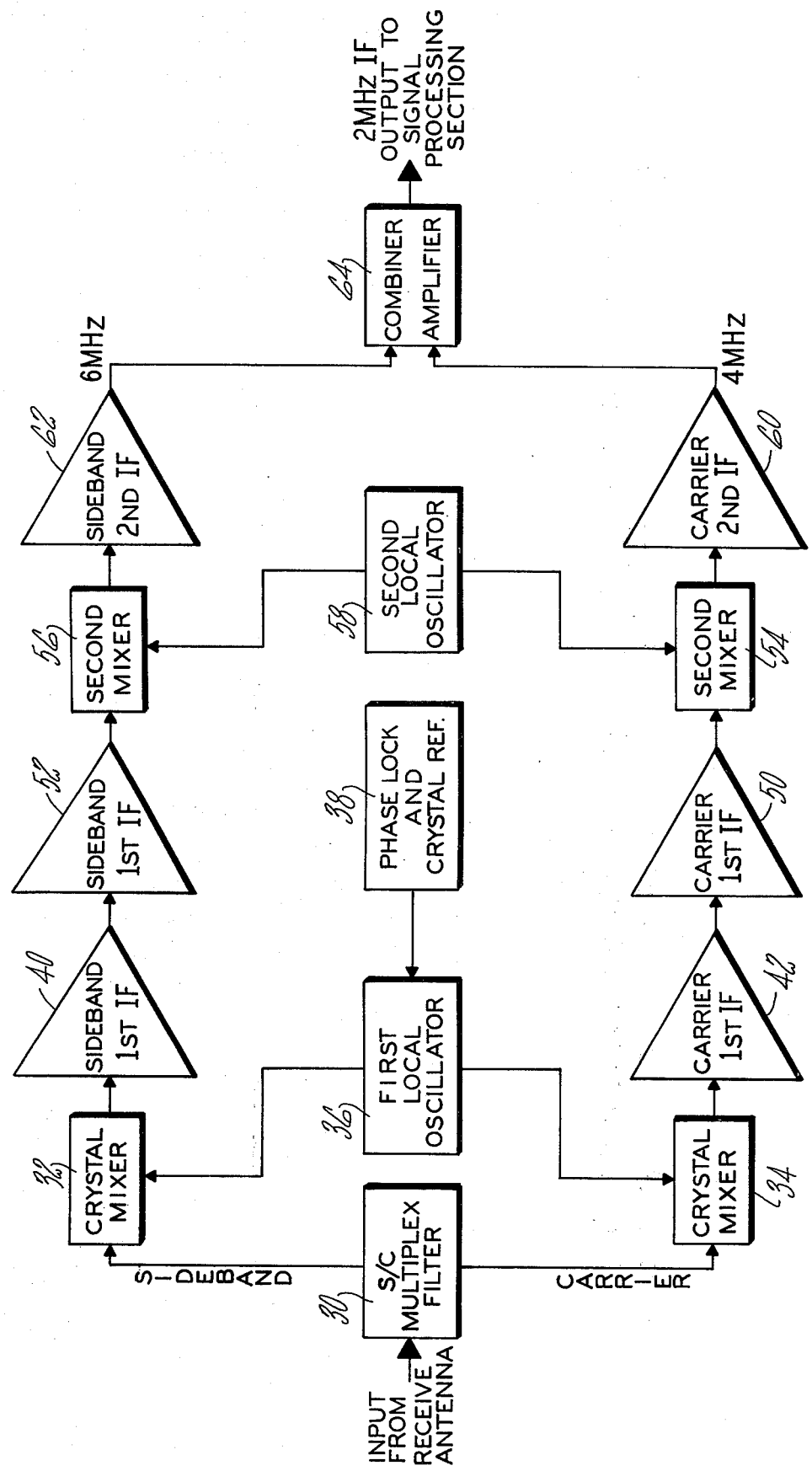
FIG. 3 is a functional block diagram of a receiver for use in the practice of the invention.

Referring to FIG. 3, which is a functional block diagram of one of the dual channel receivers associated with each of receiving antennas A, C and E, the carrier and sideband signals are coupled from the receiving antenna to a multiplex filter 30. Filter 30 provides bandpass filtering and separation of the carrier and sideband signals prior to delivery of these signals respectively to separate low-noise crystal mixers 32 and 34. The carrier and sideband signals are heterodyned in mixers 34 and 32 with the output signal from a first local oscillator 36. The heterodyning signal provided by local oscillator 36 is at a frequency between the sideband and carrier frequencies. A crystal reference phase lock circuit 38 establishes both the local oscillator frequency and frequency stability.

The beat or difference frequency outputs from mixers 32 and 34 are respectively filtered and amplified by sideband and carrier first IF amplifiers 40 and 42. The IF signals appearing at the outputs of amplifiers 40 and 42 are fed directly to the IF section of the dual channel receiver. The function of the IF section is to provide further filtering and amplification of the individual carrier and sideband frequencies. This is accomplished primarily by second conversion of the first intermediate frequency to a lower second intermediate frequency. This second conversion is followed by heterodyning of the second intermediate frequency of the carrier with the second intermediate frequency signal derived from the sideband to provide a low frequency output signal which bears the same phase relationship as the original modulation frequency on reception. This result obtains as a consequence of the well-known property of preservation of phase in the process of heterodyning.

The input IF carrier and sideband signal frequencies are, as discussed above, determined by the frequency of the first local oscillator in the RF section. Nominal values of these IF frequencies for a theodolite system operating in the C-band region of the spectrum are:

1. Carrier first IF — centered at one half the modulation frequency plus 5 MHz
2. Sideband first IF frequency — centered at one half the modulation frequency minus 5 MHz.

These two IF signals are respectively amplified and further filtered by carrier first IF amplifier 50 and sideband first IF amplifier 52. The outputs of amplifiers 50 and 52 are fed to second mixers 54 and 56, respectively, where they are heterodyned with a second local oscillator signal derived from second local oscillator 58. The frequency derived from second local oscillator 58 is one half the modulation frequency minus 1 MHz; this frequency being selected such that the difference frequency derived from the second mixer 54 corresponding to the carrier second IF frequency is 4 MHz and the sideband difference frequency derived from second mixer 56 is 6 MHz. The carrier and sideband second IF signals, at 4 and 6 MHz respectively, are further filtered and amplified in second IF amplifiers 60 and 62 respectively.

The assignment of first and second local oscillator frequencies and the corresponding first and second IF frequencies for the carrier and sideband signals are essentially independent of the modulation frequency selected for system operation. In particular the modulation frequency may be at any frequency in the range from 50 MHz to 250 MHz.

The filtered and amplified second IF output frequencies from amplifiers 60 and 62 are heterodyned in a combiner/amplifier 64. The function and performance of combiner/amplifier 64 is equivalent to a third step of frequency conversion or heterodyning. Thus, in combiner/amplifier 64 the carrier component, previously translated to a frequency of 4 MHz, is heterodyned with the sideband signal component, which has been translated to a frequency of 6 MHz.

In summary, identical dual channel double conversion superheterodyne receivers, based on well-known techniques for filtering and frequency conversion, and sharing common local oscillators, provide the translation of received carrier and sideband signals received by each of the three antennas in the ground based receiving system complex to second intermediate frequencies for both the carrier and sideband signals. These second IF signals are then heterodyned with each other to provide a final intermediate frequency output signal at a nominal frequency of 2 MHz, in which the phase of each 2 MHz signal is directly related to the path length difference between the transmitting antenna and a specific receiving antenna; A, E or C.

The processing of these three signals to determine the elevation and azimuth bearing angles of the airborne transmitter involves the measurement of the phase difference between the common channel output and the elevation channel output, for determination of the elevation angle, and the phase difference between the common channel and azimuth channel signals, for determination of the azimuth bearing angle. Though these phase differences could be obtained by using relatively simple diode phase detectors, significant improvement in performance can be realized through the use of digital phase difference measurement techniques based on clock pulse counting between crossover times. Circuits of this type are commonly used in digital phase meters; the associated timing mechanism is typical of digital clock circuits.

Referring to FIG. 4, which is a block diagram of the signal processing section, the output signals from the individual IF sections of the three channels (elevation, azimuth and common), each at a frequency of 2 MHz, are filtered and amplified by the elevation, azimuth and common amplifier units 70, 72 and 74, respectively, to provide input signals to the fourth conversion mixers 76, 78 and 80 respectively. The 2 MHz input signal frequencies to these mixers, in each channel, are heterodyned with the output of a common signal processing oscillator 82. The output frequency of oscillator 82 is, in the example being discussed, centered at 1.998 MHz such that the output of each mixer is a beat frequency of 2 KHz. These 2 KHz signals are further amplified by low frequency amplifiers 84, 86 and 88. The signal processing oscillator frequency is controlled by means of a phase-lock loop 90 which derives an input signal from the common channel low frequency amplifier 88. The phase-lock circuit maintains the low frequency output of all channels at precisely the desired frequency.

A digital phase measurement circuit 92 receives the outputs of amplifiers 84, 86 and 88 and provides measurement of the phase difference between the elevation and common channel signals, and the azimuth and common channel signals respectively, in accordance with the previously described conventional "time between crossovers" digital technique. These phase differences are outputed in four digit BCD format, and also as analog voltages for driving a visual meter indicator. As previously indicated, a clock rate oscillator 93 provides the pulses utilized in the conventional digital phase measurement process.

While a preferred embodiment has been shown and described, various modifications and substitutions may be made thereto without departing from the spirit and scope of the invention. Thus, by way of example, while the transmission of radio frequency information has been discussed the present invention can be applied to acoustic waves leading to an acoustic theodolite bearing angle measurement system in underwater applications. The present invention can also be applied to the microwave modulation of coherent light beams and their reception by an "optical theodolite". Accordingly, it is to be understood that the present invention has been described by way of illustration and not limitation.

What is claimed is:

1. A passive direction finding intermediate frequency interferometry system comprising:
   means for generating a carrier signal at a first frequency;
   means for generating a modulation signal at a second frequency;
   means responsive to said carrier and modulation signals for simultaneously transmitting the carrier signal and a first sideband signal displaced in frequency from said carrier by said modulation frequency;
   first receiver means for receiving said transmitted carrier and sideband signals, said first receiver means including a receiving antenna and heterodyning means whereby said first receiver means provides a first output signal commensurate with said modulation signal;
   second receiver means for simultaneously receiving said transmitted carrier and sideband signals, said second receiver means including a receiving antenna and heterodyning means whereby said second receiver means provides a second output signal commensurate with said modulation signal, said second receiving means antenna being displaced from said first receiving means antenna by a distance determined by said second frequency; and
means connected to said first and second receiver means for comparing the phase of said first and second output signals, the phase difference between said compared signals being indicative of the bearing angle of said transmitting means to a plane transverse to and bisecting a line between said receiving means antennas.

2. The apparatus of claim 1 wherein said receiving antennas are positioned at the opposite ends of a baseline, the length of said baseline being substantially equal to the wavelength of said modulation signal.

3. The apparatus of claim 2 wherein said transmitting means comprises:
means responsive to said carrier and modulation signals for generating said first sideband signal; and
mobile transmitter means responsive to said carrier and first sideband signals for transmitting sand carrier and first sideband signals.

4. The apparatus of claim 1 further comprising:
third receiver means for simultaneously receiving said transmitted carrier and sideband signals, said third receiver means including a receiving antenna and heterodyning means whereby said third receiver means provides a third output signal commensurate with said modulation signal, said third receiving means antenna being displaced from said first receiving means antenna by a distance determined by said second frequency, said third receiving means antenna being positioned on a line transverse to a line extending through said first and second receiving means antennas.

5. The apparatus of claim 4 wherein said receiving antennas are positioned at the opposite ends of a pair of baselines, the length of said baselines being substantially equal to the wavelength of said modulation signal, one of said antennas being common to both baselines.

6. The apparatus of claim 5 wherein said transmitting means comprises:
means responsive to said carrier and modulation signals for generating said first sideband signal; and
mobile transmitter means responsive to said carrier and first sideband signals for transmitting said carrier and first sideband signals.

7. The apparatus of claim 1 wherein said phase comparing means comprises:
digital phase comparator means for measuring the time between zero voltage crossovers of the receiver means output signals.

8. The apparatus of claim 5 wherein said phase comparing means comprises:
digital phase comparator means for measuring the time between zero voltage crossovers of the receiver means output signals.

9. A method of intermediate frequency interferometry comprising the steps of:
generating a carrier frequency signal;
generating a modulation signal;
employing the modulation and carrier frquency signals to generate a first sideband signal at a frequency related to said carrier frequency;
simultaneously transmitting the carrier and first sideband signals;
receiving the transmitted carrier and sideband signals at a pair of spatially displaced points;
extracting the modulation frequency from the signals received at each point; and
comparing the phase of signals commensurate with the extracted modulation frequency to obtain an indication of the bearing angle between the point of transmission and a first plane bisecting a line interconnecting said receiving points.

10. The method of claim 9 wherein the points of reception are separated by a distance equivalent to the wavelength of the modulation signal and wherein said steps of extracting the modulation frequency each include:
heterodyning the received carrier and sideband signals to derive a signal at the frequency of the modulation signal.

11. The method of claim 9 further comprising:
simultaneously receiving the transmitted carrier and sideband signals at a third point, the third point being located in a second plane parallel to said first plane, said second plane passing through one of said pair of points;
extracting the modulation frequency from the signals received at said third point; and
comparing the phase of signals commensurate with the modulation frequency extracted at said one of said first pair of points and at said third point to obtain an indication of the elevation angle between said point of transmission and a bisector of a line interconnecting said points.

12. The method of claim 11 wherein the points of reception are separated by a distance equivalent to the wavelength of the modulation signal and wherein said steps of extracting the modulation frequency each include:
heterodyning the received carrier and sideband signals to derive a signal at the frequency of the modulation signal.

* * * * *